United States Patent [19]
Tanaka

[11] Patent Number: 5,098,177
[45] Date of Patent: Mar. 24, 1992

[54] OPTICAL FIBER CABLE

[75] Inventor: Shigeru Tanaka, Kanagawa, Japan

[73] Assignee: Sumitomo Electric Industries, Ltd., Osaka, Japan

[21] Appl. No.: 530,479

[22] Filed: May 30, 1990

Related U.S. Application Data

[63] Continuation of Ser. No. 241,255, Sep. 7, 1988, abandoned.

[30] Foreign Application Priority Data

Sep. 17, 1987 [JP] Japan .................... 62-232794

[51] Int. Cl.$^5$ .................................... G02B 6/44
[52] U.S. Cl. .................................... 385/110
[58] Field of Search .................... 350/96.23, 96.34

Primary Examiner—William L. Sikes
Assistant Examiner—Robert E. Wise
Attorney, Agent, or Firm—Cushman, Darby & Cushman

[57] ABSTRACT

An optical fiber cable employs a tension member and coated optical fibers having a tightly adhering layer which is made of a liquid-crystal polymer having a linear expansion coefficient of from $-15 \times 10^{-6}$ to $-5 \times 10^{-6}$ ($1/°$ C.), and these coated optical fibers are confined in a space in the cable with an allowance in length of 0.5%. The coated optical fibers are confined in loose tubes or in slots formed in a linear spacer.

3 Claims, 2 Drawing Sheets

OPTICAL FIBER CABLE

This is a continuation of application Ser. No. 07/241,255, filed on Sept. 7, 1988, now abandoned.

BACKGROUND OF THE INVENTION

The present invention relates to an optical fiber cable that is designed to minimize the level of temperature-dependent variations in signal propagation time. More particularly, the present invention relates to an optical fiber cable chiefly intended to be employed as signal transmission channels for high-speed data networks and phased array antennas.

In order to ensure complete synchronization in high-speed data networks or successful superposition of signals supplied to phased, array antennas, it is required that the propagation times of transmitted signals experience minimum levels of variation. If a change in temperature caused a variation in the propagation time of signals being transmitted through cables, the signals transmitted over respective routes are randomly offset to cause failure in synchronization. Furthermore, when such signals are superposed, the error due to signal offsetting will be increased.

Coaxial cables have been commonly used as signal transmission channels in high-speed data networks and phased array antennas but they have the problem of limited transmission capacity and transmission distance. Coaxial cables have the additional disadvantage that they are subject to temperature variations which are by no means small and will cause fluctuations in signal propagation time. The temperature coefficient of signal propagation time $\tau$ with the change in the temperature of the cable is given by the following equation:

$$\frac{1}{\tau}\frac{d\tau}{dT} = \frac{1}{L}\frac{dL}{dT} + \frac{1}{\sqrt{\epsilon}}\frac{d\sqrt{\epsilon}}{dT}. \qquad (1)$$

The first term on the right side of the equation represents the effect caused by the increase or decrease in the physical length L of the cable, and the second term refers to the temperature-dependent change in the dielectric constant $\sqrt{\epsilon}$ of the plastic insulator in the coaxial cable. Each of these factors has a positive coefficient of the order of $10^{-5}$ (1/°C.), so the overall effect of the increase in the temperature of the cable is delayed propagation of signals. This positive temperature coefficient of propagation time is a factor that limits the distance over which signals can be transmitted by the cable when it is used as a signal-carrying channel in a high-speed data network or phased array antenna.

With a view to avoiding the above-described problems associated with coaxial cables, the use of optical fiber cables as signal transmission channels has been proposed.

Replacement of coaxial cables by optical fiber cables is effective in avoiding the problems of low transmission capacity and high transmission loss. However, even optical fiber cables lack complete freedom from the problem of temperature dependency of signal propagation time. The temperature coefficient of propagation time $\tau$ for an optical fiber cable is given by the following equation:

$$\frac{1}{\tau}\frac{d\tau}{dT} = \frac{1}{L}\frac{dL}{dT} + \frac{1}{n}\frac{dn}{dT}. \qquad (2)$$

As is clear from equation (2), the temperature coefficient of propagation time $\tau$ is subject to variations that are partly due to the linear expansion coefficient of the cable, the physical length L of which varies with temperature (this factor is represented by the first term on the right side of the equation), and partly to the temperature coefficient of the refractive index n of the optical fiber glass (this factor is represented by the second term). With optical cables in current use, the linear expansion coefficient $$\frac{1}{L}\frac{dL}{dT}$$

in the first term is in the range of from 1 to $2 \times 10^{-5}$ (1/°C.) and the temperature coefficient of refractive index $$\frac{1}{n}\frac{dn}{dT}$$

in the second term is $6.5 \times 10^{-6}$ (1/°C.) if the optical fiber is made of silica glass. Therefore, the temperature coefficient of propagation time $\tau$ is calculated to be $$\frac{1}{\tau}\frac{d\tau}{dT} \approx 2 \times 10^{-5} (1/°C.).$$

In other words, even an optical fiber cable employing low-loss and wide-band optical fibers is not capable of transmitting signals over a substantially longer distance than coaxial cables if it is used as a signal transmission channel in high-speed data networks or phased array antennas.

SUMMARY OF THE INVENTION

An object of the present invention is to solve the above-described problems. More specifically, an object of the invention is to provide an optical fiber cable which is so designed that the temperature dependency of signal propagation time in optical fibers is made smaller than the value inherent in the glass of which the optical fibers are made.

According to the first aspect of the present invention, the optical fiber cable employs a tension member and coated optical fibers having a tightly adhering coating layer as part of the coating which is made of a material having a Young's modulus of from 500 kg/mm² to 10,000 kg/mm² and a linear expansion coefficient of from $-15 \times 10^{-6}$ (1/°C.) to $-5 \times 10^{-6}$ (1/°C.), and these coated optical fibers are confined in a space in the cable in such a way as to provide a certain allowance in length. In a preferred embodiment, the tightly adhering coating layer is made of a liquid-crystal polymer. In another preferred embodiment, the coated optical fibers are confined in the cable in such a way as to provide an allowance of 0.5% in length.

According to the second aspect of the present invention, coated optical fibers which are the same as those defined in the first aspect ar loosely confined in tubes, stranded around a tension member in such a way as to provide a certain allowance in length and covered with a cable sheath.

According to the third aspect of the present invention, coated optical fibers which are the same as those defined in the first aspect are confined in grooves in the surface of a linear spacer in such a way as to provide a certain allowance in length, with a tension member being buried in the spacer, and the spacer is wrapped by a cable sheath. In a preferred embodiment, the tension member in the linear spacer is made of a liquid-crystal polymer having a negative linear expansion coefficient.

Other and further objects, features and advantages of the invention will appear more fully from the following description taken in connection with the accompanying drawings.

DETAILED DESCRIPTION OF THE PREFERRED EMBODIMENTS

From equation (2) for the temperature coefficient of signal propagation time $\tau$ in an optical fiber cable, it can be seen that in order to reduce the temperature coefficient $$\frac{1}{\tau} \frac{d\tau}{dT},$$

the value of the linear expansion coefficient $$\frac{1}{L} \frac{dL}{dT}$$

in the first term on the right side of the equation needs to be made negative so as to cancel out the temperature coefficient of the refractive index n of optical fiber glass $$\frac{1}{n} \frac{dn}{dT}$$

in the second term. The linear expansion coefficient $\alpha_f$ of an optical fiber itself generally assumes a positive value of $6 \times 10^{-7}$ (1/°C.), so a composite material having a negative overall linear expansion coefficient can be obtained by providing the optical fiber with a tightly adhering coating that has a negative linear expansion coefficient.

Figure 5:
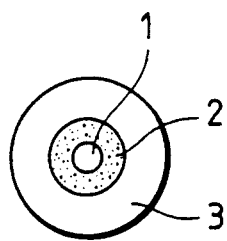
FIG. 5 is a cross section of a typical coated optical fiber.

The construction of the present invention and the mode of its action are described hereinafter with reference to the case where a coated optical fiber having the cross-sectional profile shown in FIG. 5 is employed. The coated optical fiber consists of an optical fiber 1 that is covered first with a soft primary coating 2, then a secondary coating 3 having a negative linear expansion coefficient. The primary coating 2 intended to improve the lateral compression characteristics of the coated optical fiber is not an essential element for the present invention and may be omitted without causing any material effect on the construction of the present invention and the mode of its action which will be described below.

Equation (2) may be rewritten more specifically as follows:

$$\frac{1}{\tau} \frac{d\tau}{dT} = \left(1 + \frac{1}{N} \frac{dN}{d\epsilon}\right)\alpha_{eq} - \frac{1}{N} \frac{dN}{d\epsilon} \alpha_f + \frac{1}{N} \frac{dN}{dT} \quad (3)$$

where $$\alpha_{eq} = \frac{\alpha_f E_f S_f + \alpha_p E_p S_p + \alpha_s E_s S_s}{E_f S_f + E_p S_p + E_s S_s}$$

$\alpha$: linear expansion coefficient;
E: Young's modulus;
S: cross-sectional area;
f: the subscript for the optical fiber portion;
p: the subscript for the primary coating;
s: the subscript for the secondary coating;
$\epsilon$: the strain in the optical fiber; and
N: the refractive index of optical fiber glass.

The effects shown by equation (3) include the one representing the change in the refractive index of the optical fiber glass that is caused by any strain imposed upon the optical fiber. In view of equation (3), the linear expansion coefficient $\alpha_s$ of the secondary coating that is necessary to reduce the temperature coefficient of signal propagation time in the optical fiber to zero is given by:

$$\alpha_s = \frac{(E_s S_s + E_p S_p + E_f S_f)\left\{\dfrac{-\dfrac{1}{N}\dfrac{dN}{dT} + \dfrac{1}{N}\dfrac{dN}{d\epsilon}\alpha_f}{1 + \dfrac{1}{N}\dfrac{dN}{d\epsilon}}\right\} - \alpha_f E_f S_f - \alpha_p E_p S_p}{E_s S_s} \quad (4)$$

Figure 6:
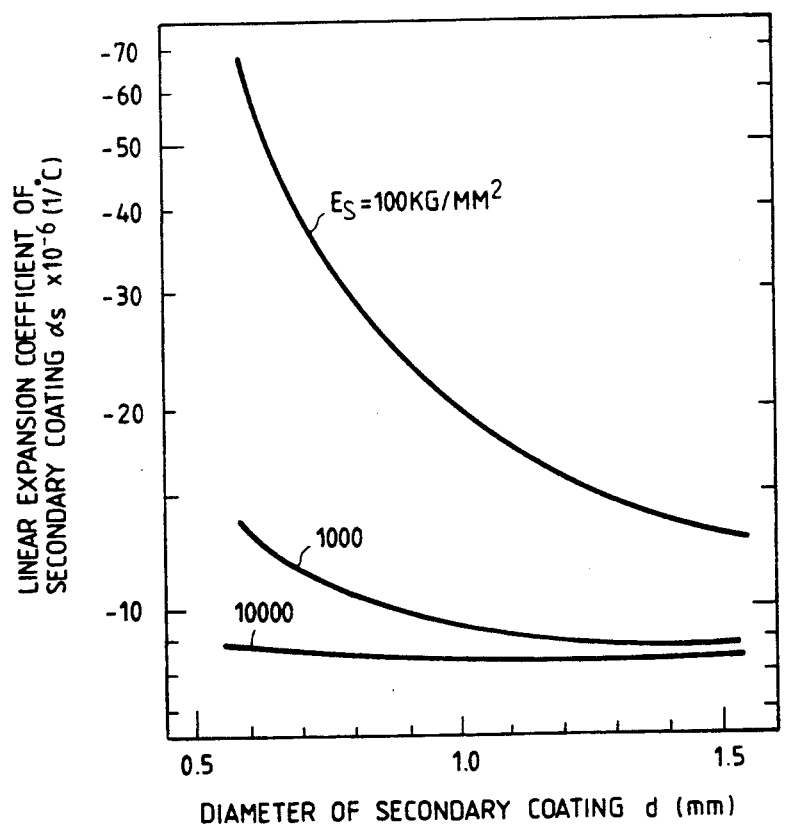
FIG. 6 is a graph showing the linear expansion coefficient of the secondary coating that reduces the temperature coefficient of propagation time in coated optical fibers to zero.

Considering that generally the terms for the primary coating are 3 orders smaller than the other terms on the right side of equation (4), let us substitute specific numerical values in this equation. The primary coating is typically a silicone rubber coating having a diameter of 400 $\mu$m. Suppose this primary coating is provided with a secondary coating ranging in diameter (d) from 0.6 to 1.5 mm. FIG. 6 shows the values of the linear expansion coefficient $\alpha_s$ of the secondary coating as calculated from equation (4) for three different values of its Young's modulus $E_s$, 100 kg/mm², 1,000 kg/mm² and 10.000 kg/mm². As one can see from FIG. 6, if the diameter of the secondary coating is 1 mm, the linear expansion coefficient of the secondary coating $\alpha_s$ must be $-2 \times 10^{-5}$ (1/°C.), $-9.45 \times 10^{-6}$ (1/°C.) or $-8.4 \times 10^{-6}$ (1/°C.) for Es of 100 kg/mm², 1,000 kg/mm² or 10,000 kg/mm², respectively. Generally speaking, the greater the Young's modulus of the secondary coating Es, or the larger its diameter d, the smaller the absolute value of linear expansion coefficient $\alpha_s$ that needs to be possessed by the secondary coating. As a guide, $E_s$ of at least 500 kg/mm² and $\alpha_s$ of no more than $-5 \times 10^{-6}$ (1/°C.) are sufficient to provide an optical cable that is appreciably improved over the existing products.

Figure 7:
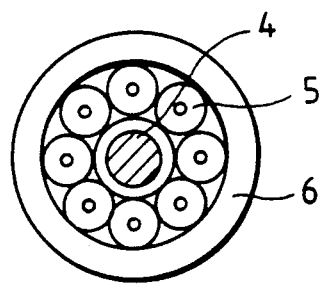
FIG. 7 is a cross section of a prior art optical cable.

Coated optical fibers that are stabilized in signal propagation time by specifying the Young's modulus $E_s$ and linear expansion coefficient $\alpha_s$ of the secondary coating may be employed in an optical fiber cable having the cross-sectional profile shown in FIG. 7. This cable consists of coated optical fibers 5 that are stranded around a central tension member 4 and which are coated with a sheath 6. Usually, the tension member 4 is a steel wire and the sheath 6 is made of polyethylene, so the overall linear expansion coefficient of the cable assumes a comparatively large positive value of approximately 1 to $2 \times 10^{-5}$ (1/°C.). The linear expansion coefficients of the steel wire and polyethylene are approximately $1.2 \times 10^{-5}$ (1/°C.) and $1 \times 10^4$ (1/°C.), respectively. If the coated optical fibers stabilized in signal propagation time according to the present invention are directly employed in the conventional optical cable having the construction shown in FIG. 7, the cable incorporating these coated optical fibers will have a positive, rather than negative, linear expansion coefficient, and this again leads to the development of temperature dependency of signal propagation time. In order to solve this problem, the optical fiber cable of the present invention has the coated optical fibers confined in such a way as to provide a certain allowance in length. In a preferred embodiment, the tension member is made of a material having a negative linear expansion coefficient.

The requirement for providing a certain allowance in length for the coated optical fibers may be explained as follows. A space or spaces are provided within the optical fiber cable and an individual coated optical fiber is confined in the space or in each of these spaces with a certain allowance in length being provided. Even if the cable has a positive overall linear expansion coefficient, the increase or decrease in the cable length will not be directly transmitted to the coated optical fibers, which hence will retain the specified negative value of linear expansion coefficient.

Spaces may be provided within the optical fiber cable by either employing loose tubes or by forming slots. If the range of operating temperature of the cable, the linear expansion coefficient of each of the coated optical fibers, and the linear expansion coefficient of the cable are written as $\Delta T$, $-\alpha_f$ and $\alpha_c$, respectively, the allowance in length $\epsilon$ that is to be provided for each of the coated optical fibers is given by:

$$[\epsilon] = (\alpha_f + \alpha_c) \times \Delta T \quad (5).$$

Assuming $\alpha_f = 9 \times 10^{-6}$ (1/°C.), $\alpha_c = 2 \times 10^{-5}$ (1/°C.) and $\Delta T = 100°$ C., $\epsilon = (9 \times 10^{-6} + 2 \times 10^{-5}) \times 100 = 0.0029$ which can be approximated as $[\epsilon] = 0.3\%$. If an allowance of at least 0.5% is provided on the safer side, there is no possibility that the negative linear expansion coefficient inherent in the coated optical fibers confined in the cable will be adversely affected by its positive overall linear coefficient.

More desirably, the linear expansion coefficient of the optical fiber cable itself is made either negative or to assume a positive value that is as close as possible to the negative. To this end, the tension member may be formed of a material having a negative linear expansion coefficient.

The above-described requirements that a certain allowance in length be provided for the coated optical fibers and that the tension member be formed of a material having a negative linear expansion coefficient may be combined in accordance with a specific purpose and this is also an effective embodiment of the present invention. Two preferred embodiments of the present invention are described below in a specific way with reference to the accompanying drawings.

Embodiment 1

Figure 3:
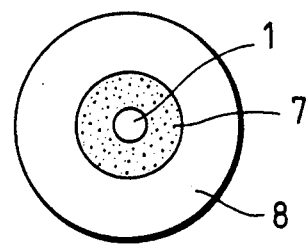
FIG. 3 is a cross section of a prototype LCP coated optical fiber prepared in accordance with the present invention.
Figure 4:
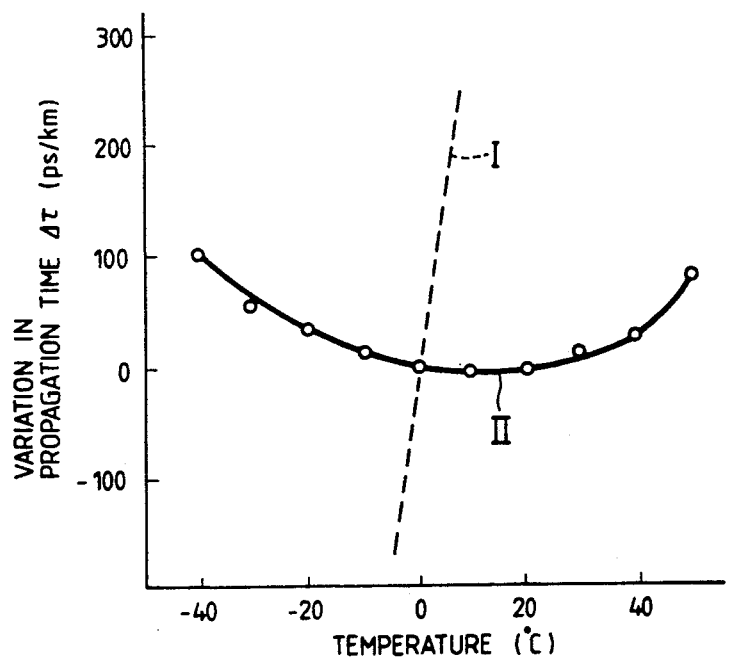
FIG. 4 is a graph showing the temperature dependency of signal propagation time in the prototype LCP coated optical fiber.

Using a liquid-crystal polymer (hereinafter referred to as LCP) as the material of a secondary coating, a prototype of an LCP coated optical fiber having the cross-sectional profile shown in FIG. 3 was prepared. Shown by 1 in FIG. 3 is an optical fiber which is provided both with a primary coating 7 made of a silicone resin and with the LCP secondary coating 8. The LCP in the secondary coating 8 has a linear expansion coefficient of $-9 \times 10^{-6}$ (1/°C.) and a Young's modulus of 1,000 kg/mm² at 20° C. or 3,000 kg/mm² at $-40°$ C. The optical fiber 1 was a single-mode fiber having a core diameter of 9 μm, $\Delta n$ (difference in refractive index between core and cladding) of 0.3%, and a cladding diameter of 125 μm. This optical fiber was coated with a silicone resin (primary coating 7) to an outer diameter of 400 μm, then extrusion-coated with LCP (secondary coating 8) to an outside diameter of 800 μm. Signal propagation time in the so prepared prototype of LCP coated optical fiber had the temperature dependency shown by curve II in FIG. 4. The variation in propagation time $\Delta \tau$ with temperature reached zero at a temperature of about 10° C., indicating that the signal propagation time in the coated fiber was stabilized against temperature-dependent variations because of the negative linear expansion coefficient of LCP. The temperature characteristics inherent in the optical fiber glass are shown by curve I in FIG. 4. Comparison between curves I and II shows that a significant improvement was attained by coating the optical fiber with LCP.

Using the LCP coated optical fiber, a prototype optical fiber cable (hereinafter referred to as an optical cable) having the cross-sectional profile shown in FIG. 1 was fabricated. Eight LCP coated optical fibers 9 were loosely confined within PBT, (polybutyleneterephthalate) tubes 10 having an inside diameter of 1.8 mm and an outside diameter of 3.5 mm and thereafter stranded around a tension member 11 (o.d., 6 mm) with a pitch of 200 mm. The tension member 11 consisted of a strand of 7 steel wires having a diameter of 1.2 mm. The cable core made of the LCP coated fibers and the tension member was surrounded with a plastic tape 12 and covered with an outer LAP sheath 13 to fabricate an optical cable having a final outside diameter of 19 mm.

Since the LCP coated optical fibers 9 were loosely contained in the PBT tubes 10, the difference between $2a_1$ (i.e., distance between diametrically positioned lays of the fiber strand when each fiber was in the center of tube 10) and $2a_2$ (distance between diametrically positioned lays when each fiber was offset toward the center of the cable) would produce in each of the coated optical fibers 9 an allowance in length [$\epsilon_0$] that is expressed by:

$$[\epsilon_0] = \sqrt{1 + \left(\frac{2\pi a_1}{P}\right)^2} - \sqrt{1 + \left(\frac{2\pi a_2}{P}\right)^2} \quad (6)$$

where P is the pitch at which the coated optical fibers are stranded around the tension member.

Figure 1:
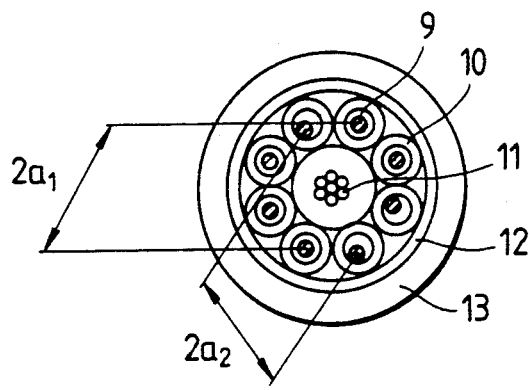
FIG. 1 is a cross section of an optical fiber cable according to the first embodiment of the present invention.

Substituting $2a_1 = 9.5$ mm, $2a_2 = 8.5$ mm and P=200 mm in equation (6) for the optical cable shown in FIG. 1, we obtain [$\epsilon_0$]=0.86%. The temperature dependency of signal propagation time in the optical fibers in the so prepared optical cable was found to be coincident with the curve II in FIG. 4 within the range of the precision of measurement. It was therefore established that the LCP coated optical fibers having the cross-sectional profile shown in FIG. 3 retained good temperature dependency of signal propagation time even after fabrication in a cable.

Embodiment 2

Figure 2:
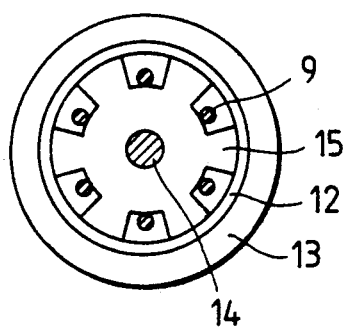
FIG. 2 is a cross section of an optical fiber cable according to the second embodiment of the present invention.

Using LCP coated optical fibers having the cross-sectional profile shown in FIG. 3 as in Embodiment 1, a spacer-type optical cable having the cross-sectional profile shown in FIG. 2 was fabricated. In the cable, LCP coated optical fibers 9 with the diameter of 800 μm were confined in spiral grooves 2 mm deep and 1.8 mm wide which were made in the surface of a linear spacer 15. The spacer 15 was made of a polyethylene string having a diameter of 10 mm which had an LCP tension member 14 (3 mm$\phi$) buried in its center. The pitch of the spiral grooves was 200 mm. The LCP coated optical fibers 9 confined in these grooves were made longer than the latter to provide an allowance in length [$\epsilon_0$] of 0.6%. The cable core made of the LCP coated optical fibers 9 confined in the grooves in the linear spacer 15 was surrounded with a plastic tape 12 and covered with an outer LAP sheath 13 to fabricate a spacer-type optical cable having a final outside diameter of 15.5 mm. With this optical cable wound onto a drum having a diameter of 600 mm, the temperature dependency of light signal propagation time in the fibers was measured. The result of measurement was coincident with the curve II in FIG. 4 within the range of the precision of measurement. It was therefore established that the LCP coated optical fibers having the cross-sectional profile shown in FIG. 3 which was employed in Embodiment 2 retained their good temperature dependency of signal propagation time even after fabrication in a cable.

As described on the foregoing pages, the optical fiber cable of the present invention employs optical fibers that are provided with the coating that effectively reduces the temperature dependency of signal propagation time in the coated fibers to the level below the value inherent in the optical fiber glass and such coated optical fibers are contained in the optical cable in such a way as to provide the allowance in length in comparison with the cable itself. The optical fiber cable of the present invention offers the great advantage that by utilizing it as a signal transmission line in a high-speed data network or a phased array antenna, a data signal transmission system can be configured that is free from the temperature dependency of propagation time which has been a limiting factor in the prior art optical cables and coaxial copper cables.

What is claimed is:

1. An optical fiber cable comprising:
   a tension member provided at a center portion of said optical fiber cable; and
   a plurality of coated fibers having respective tightly adhering coating layers having a negative linear expansion coefficient, said adhering coating layers minimizing in said coated fibers a variation in propogation time of signals due to an corresponding change in a temperature of said respective coated fibers, said coated fibers being loosely confined in a space in said optical fiber cable.

2. An optical fiber cable as recited in claim 1, wherein said tightly adhering coating layers include a liquid crystal polymer.

3. An optical fiber cable as recited in claim 1, further comprising:
   a linear spacer having grooves in a surface thereof, each of said plurality of coated optical fibers being confined in one of said grooves, said tension member being buried in said linear spacer; and
   a cable sheath for covering said linear spacer.

* * * * *